United States Patent [19]

Olson et al.

[11] Patent Number: 4,671,583
[45] Date of Patent: Jun. 9, 1987

[54] FASTENING DEVICE AND METHOD FOR COMPOSITE STRUCTURES

[75] Inventors: Alden G. Olson, Renton; Glenn O. Olson, Seattle, both of Wash.

[73] Assignee: The Boeing Company, Seattle, Wash.

[21] Appl. No.: 783,605

[22] Filed: Oct. 3, 1985

Related U.S. Application Data

[63] Continuation of Ser. No. 469,347, Feb. 24, 1983, abandoned.

[51] Int. Cl.⁴ .............................................. H01R 4/28
[52] U.S. Cl. ...................................... 439/92; 439/801
[58] Field of Search ................. 339/14 R, 14 L, 17 C, 339/95 A, 263 R, 263 L, DIG. 3; 403/408; 411/184, 378, 537, 538

[56] References Cited

U.S. PATENT DOCUMENTS 3,512,446 5/1970 Sekhon ................................ 403/408

Primary Examiner—Joseph H. McGlynn
Attorney, Agent, or Firm—Conrad O. Gardner; B. A. Donahue

[57] ABSTRACT

Fastener, e.g., stud, installation in a composite panel, such as a graphite epoxy structure having a longitudinal electrical conductivity substantially greater than the transverse electrical conductivity, is achieved in a manner providing increased conductivity between fastener assembly and the panel to which it is attached. Through panel countersink and fastener configurations, e.g., by use of frustro conical countersink to spherical fastener surface configurations, increased electrical contact is made to conductive fibers in the composite material which run at right angles to the central axis of the fastener.

2 Claims, 12 Drawing Figures

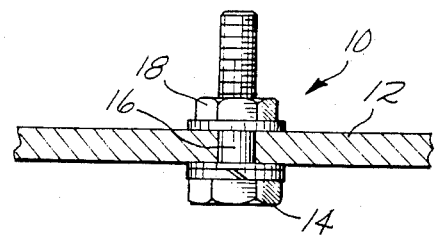
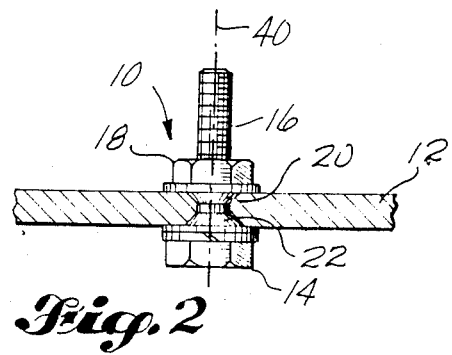
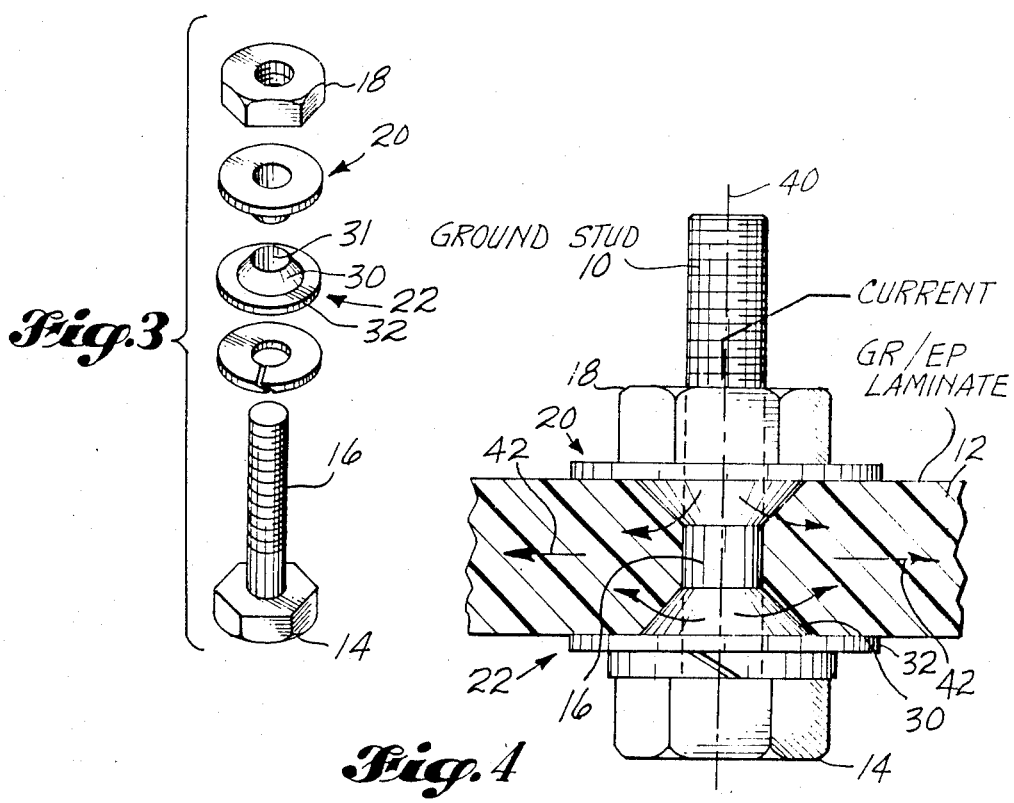

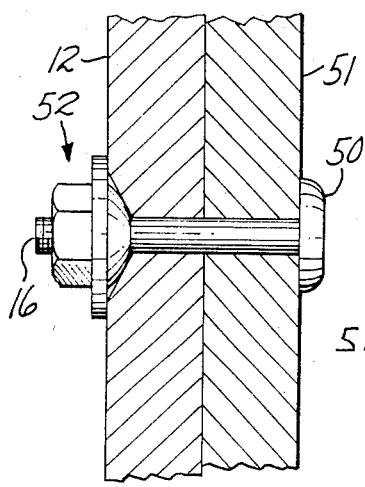
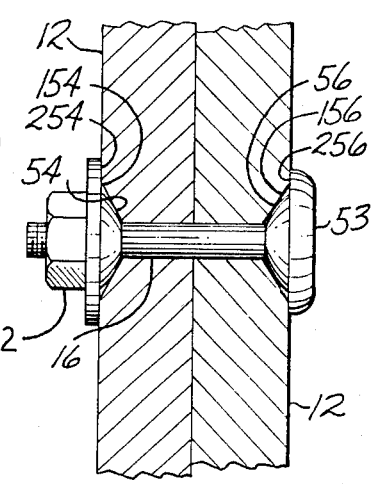
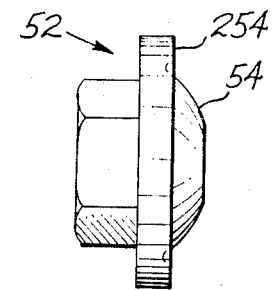
Fig. 5  Fig. 6  Fig. 7
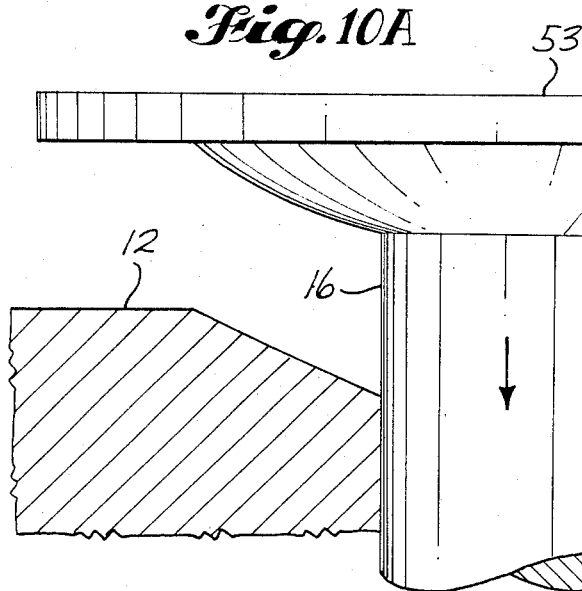
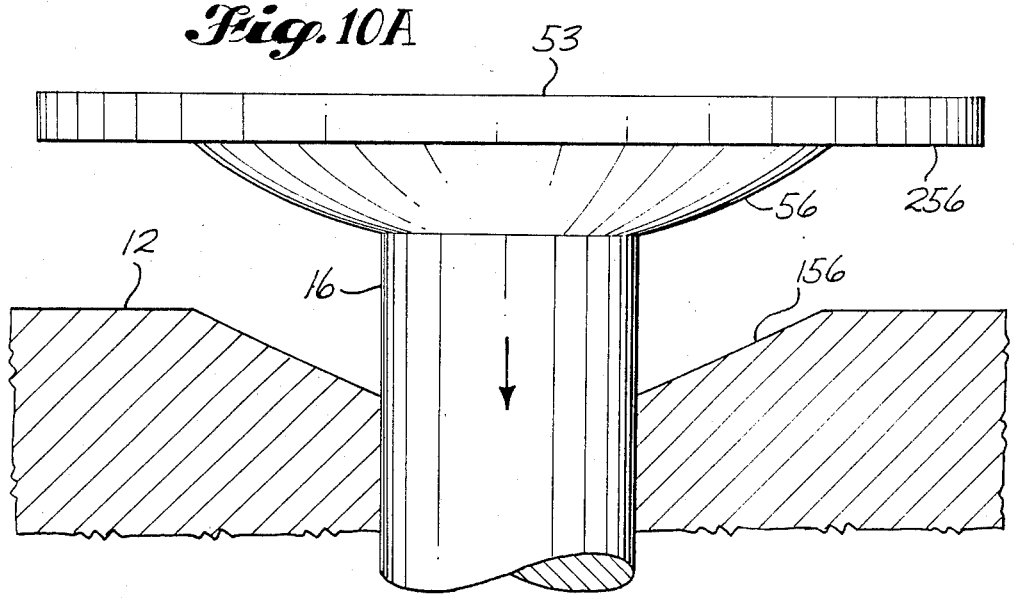
Fig. 8
Fig. 9
Fig. 10A

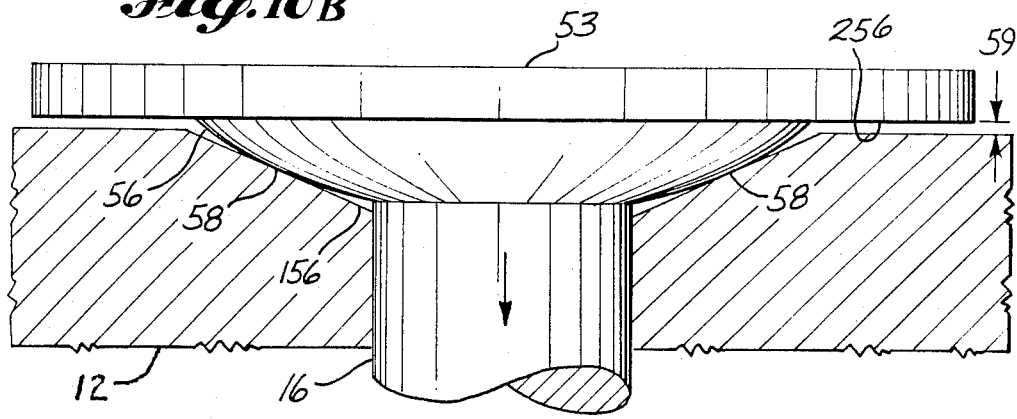
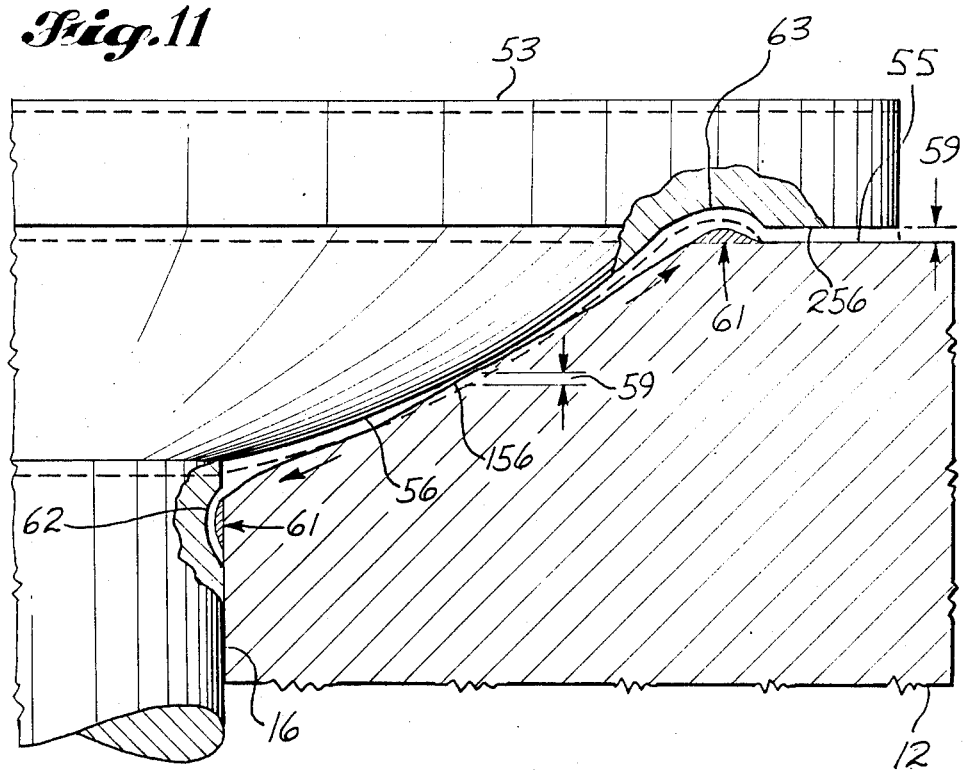

FASTENING DEVICE AND METHOD FOR COMPOSITE STRUCTURES

This is a continuation of application Ser. No. 469,347, filed Feb. 24, 1985, now abandoned.

This invention relates to improvements in fastener arrangement for composite structures shown in copending U.S. patent application Ser. No. 333,248 filed Sept. 30, 1981, also assigned to The Boeing Company, and, more particularly, to methods and associated fastener arrangements for establishing electrical continuity between fasteners and composite structures.

Electrical conductivity through graphite epoxy composite structural joints which would utilize current fastening techniques would tend to create (1) potential structural damage, and (2) possible hazardous fuel ignition from lightning currents in certain applications. This potential damage and/or ignition hazard potential is the result of reduced conductivity of composite such as graphite epoxy laminates when fastened together. It will be recognized that the resistivity of graphite epoxy composites varies from $10^3$ to $10^6$ times that of an equivalent aluminum sheet. Besides the aforementioned problem of utilizing current fasteners for composite structural joints, the utilization of current fasteners of the ground stud type for electrical bonding in fuel hazard areas becomes more critical due to the increased resistivity of such composite structures, viz., graphite epoxy laminates which are utilized to replace aluminum structure in airframes. Static charge dissipation and fault current loads from system failures must satisfy the requirements of an electrical bonding and grounding system for composite structured aircraft. As a consequence, current fasteners of the ground stud type for use in composite structure electrical system current return paths, as well as bonding for RF potential and static charge applications, would not appear as satisfactory.

The patent literature, e.g., U.S. Pat. Nos. 3,105,950 and 3,145,362, are noted for their showing in FIG. 4 of bolt fastening devices employing dual countersink configurations. A further similarly configured fastening construction is shown in U.S. Pat. No. 2,030,088.

It is accordingly an object of the present invention to provide the means in combination with a fastener for providing increased electrical conductivity between fastener and fastened composite structures.

It is a further object of the present invention to provide a method of assembling fasteners and composite structures in a manner providing increased conductivity between structures and fastener.

It is yet another object of the present invention to provide means for increasing electrical conductivity between fasteners and graphite epoxy structures by increasing the number of electrical connections between the fastener and the graphite filaments of the epoxy structures.

A full understanding of the invention, and of its further objects and advantages, and the several unique aspects thereof, will be had from the following description when taken in conjunction with the accompanying drawings in which:

FIG. 1 is illustrative of prior art fastener connection installed in a composite panel structure;

FIG. 2 is a sectional view illustrative of an apparatus and method in accordance with a preferred embodiment in prior application Ser. No. 333,248 providing increased conductivity between fastener and composite structure;

FIG. 3 is a view of the assembly of FIG. 2 blown apart to shown the manner of assembly of the fastener arrangement of FIG. 2;

FIG. 4 is an expanded and enlarged view of the cross section of the fastener assembly shown in FIG. 2 deemed helpful in understanding the manner in which increased conductivity is achieved;

FIG. 5 is a cross-sectional view of an improved fastener assembly, in accordance with an embodiment of the present invention, which illustrates the fastening together of graphite epoxy materials to metals (e.g. aluminum or titanium materials);

FIG. 6 is an expanded and enlarged view of the cross section of an improved fastener assembly, in accordance with an embodiment of the present invention, for fastening together two graphite epoxy composite structures;

FIG. 7 illustrates the improved spherically shaped surface of a fastener nut shown in FIGS. 5 and 6;

FIG. 8 illustrates the improved spherically shaped surface of a fastener washer useful with a state-of-the-art nut as alternative fastening means to the fastener nut shown in FIG. 7.

FIG. 9 shows the improved spherically shaped undersurface of the head of the threaded fastener shown in FIG. 6;

FIGS. 10A and 10B are expanded and enlarged views of the steps by which the spherically shaped underhead surface portion of the fastener of FIG. 9 is sequenced by the present method into a tightened position; and, FIG. 11 is an expanded and enlarged partial view of the spherically shaped fastener surface portion relative to the countersunk composite structure at initial contact and then in the fully tightened position (in dotted line representation).

Turning now to FIG. 1, it will be seen that in the prior art stud assembly attachment to a composite panel, the stud assembly, indicated generally by the numeral 10, includes a bolt, having a head portion 14 and a shank portion 16, passing through the composite panel structure 12. The usual washers and locking nut 18 complete the assembly of grounding stud 10 to composite panel structure 12.

Turning now briefly to FIG. 2, representative of the prior frustro conically shaped fastener configuration shown in U.S. patent application Ser. No. 333,248, it will be noted that a pair of countersunk insert devices 20 and 22 are utilized on opposite sides of composite panel member 12 to provide increased and improved conductivity between the shank 16 of fastener 10 and composite panel structure 12. Conductivity is ultimately provided to the shank 16 from two directions, viz., in the path from 12 to 22, through the lock washer, then through to 14 which is integral to the shank 16, also, from 12 to 20, through nut 18 which is threaded to shank 16.

It can be seen in FIG. 3 that countersunk insert device 22 comprises a generally tubular shaped body of metal (e.g., corrosion resistant stainless steel or titanium) having two continuous integral coaxial portions 30 and 32 disposed about the central axis 40 of the fastener 10 shown in place in FIG. 4. Countersunk insert device 22, being of tubular shape about coaxial hole 31 comprises an upper frustro conical shaped portion 30 and a lower cylindrically shaped flange-like portion 32.

Graphite epoxy structures such as panel member 12 shown in FIG. 4 have much better conductivity in a longitudinal direction (the current flow stays in the plies) than in the transverse direction, such as in the direction 40 along the central axis of a fastener inserted in the graphite epoxy structure. The reason for this is that the currents must cross the epoxy boundary between plies and run transverse to the graphite filaments which lie along the longitudinal direction 42 of current flow within the graphite epoxy structure 12. This difference in conductivity can be as high as 200:1. The countersunk insert devices 20 and 22, in accordance with prior efforts as shown in aforementioned U.S. patent application Ser. No. 333,248, provide the increased conductivity between shank of a fastener, such as the grounding stud 20 shown in FIG. 4, and the longitudinal fibers of the conductive structure running in the direction of current flow represented by the numerals 42 in FIG. 4. The ratio of transverse (surface-to-surface) to longitudinal (edge-to-edge) resistivity is approximately 200:1 for a graphite epoxy type composite structure 12. Further, it should be noted that the resistivity of graphite epoxy composite structures varies from $10^3$ to $10^6$ times that of an equivalent aluminum sheet. Therefore, the optimum bonding and ground resistance for a fastener such as a ground stud 10 shown in FIG. 4 in a composite panel structure 12 can be successfully realized by utilization of countersunk insert devices 20 and 22 which provide electrical contact between shaft portion 16 of a fastener and an increased number of the longitudinal fibers of the composite structure 12. This is due to the frustro conical shaped portion 30 of countersunk insert 22. Transverse conductivity is also improved between the faying surface of countersunk insert device 22 and the outer plies of composite structure 12. Countersunk insert device 20 is shaped identical to countersunk insert device 22 hereinbefore described, and is located in a complementary-shaped countersunk hole on the other side of composite structure 12. The hereinabove described embodiment teaches a method and structures including the utilization of countersunk insert devices which will achieve the maximum transfer of currents between the shanks of fastening devices and longitudinally extending fibers in composite panel structures in which fasteners are utilized. The longitudinal conductivity property of these advanced composites, such as graphite epoxy composites, may be utilized in accordance with further embodiments of the invention by those skilled in the art, recognizing that the aforementioned countersunk insert devices may be utilized where, for example, fasteners such as self-locking nuts, shear collars, fixed nut plates or floating nut plates are utilized. The present countersunk insert devices may be utilized on either side of a pair of composite panel members being secured together by standard types of fasteners having shank portions 16 which must be connected to longitudinally extending fibers in the composite panel members utilizing the aforementioned increased conductivity teachings.

An improvement in the shape of the frustro conical surface of the fastener surfaces shown in FIGS. 1-4, hereinafter referred to as spherical in embodiment of the present invention shown in FIGS. 5-11, and its effects on the improved electrical conductivity and distributed bearing load are hereinafter described.

As shown in FIG. 5, a standard protruding-head fastener 50 (or standard washer and nut, not shown) will provide a good electrical connection to a metal (e.g. aluminum or titanium) sheet 51 if properly utilized for securing structures together. A nut 52 as shown in FIGS. 5 and 6 (or spherical washer of the type shown in FIG. 8 and standard nut) could, in the alternative, provide a good electrical connection to the graphite epoxy material 12 when secured with the threaded shank 16 of the standard-head fastener 50.

FIG. 6 illustrates a graphite epoxy 12 sandwich assembly fastened together with improved fasteners in accordance with an embodiment of the present invention. A nut 52, detailed and described hereinafter in FIG. 7, and a fastener 53, detailed and described hereinafter in FIG. 9, with threaded shank 16, are tightened to bring fastener spherical surfaces 56 and 54 into intimate contact with frustro conically shaped countersunk surfaces 156 and 154, respectively; the flat bearing surface portions 254 and 256 of nut 52 and fastener 53 interface with the outer surface of the graphite epoxy material underside sandwich structure 12.

The improved spherical shape 54 may be seen as an integral part of the bottom surface of a fastener nut 52 as shown in FIG. 7, a washer 57 as shown in FIG. 8 or as bottom head portion 56 of the fastener 53 having shank 16 as shown in FIG. 9. Several combinations of these fastener configurations, as exemplified above, may be obtained by selection of the appropriate fastener components from the embodiments illustrated for the materials to be fastened together, e.g. as in FIG. 6 for a composite sandwich and as in FIG. 5 for a composite metal sandwich.

FIGS. 10A and 10B show fastener 53 being inserted into a countersunk hole in a graphite epoxy laminate material 12. The fastener 53 is inserted until the head underside spherical surface 56 comes into contact with the countersink surface at point 58 (see FIG. 10B) which is tangent to it and with a gap 59 (see FIG. 10B) between the flat interfacing surface 256 of the fastener 53 and flat surface portion 55 of graphite epoxy material 12. Tightening of a nut at the threaded end of fastener shank 16 will draw the fastener into the hole a predetermined amount 59 as illustrated in the enlarged view of FIG. 11. The head underside spherical surface portion 56 of fastener 53 will displace the graphite epoxy material into the shaded areas 61 and provide intimate electrical contact with the graphite fibers. Relief, in the form of a small smooth circumferential groove 62 may be provided in the shank 16 at 62 and head underside spherical surface 56 at 63 to allow space for the displaced material to flow into so that the flat mating surfaces 256 of the fastener and 55 of the graphite epoxy may come together. Intimate electrical contact is thus obtained and the bearing load is distributed over the enlarged mating flat surfaces 256 of the fastener and 55 of the graphite epoxy structure 12.

In summary, and in contrast, it is seen that the conducting of electrical current between the frustro conical fastener surfaces and the complementary frustro conically shaped countersunk interface of the graphite epoxy material, as described in the embodiments of FIGS. 2, 3, and 4 of U.S. patent application Ser. No. 333,248, were dependent on manufacturing tolerances. That is, to obtain good electrical contact and good bearing strength for the fastener installation, precise hole alignment and countersink depth were required. Electrical contact at the countersunk surfaces and flat bearing surface clamp-up are thus achieved.

Out of tolerance countersink in the fastener configurations of FIGS. 2, 3, and 4 would result in the following:

(1) If the countersink in the graphite epoxy material is too shallow, electrical contact between the frustro conical fastener surface and the countersink is good. However, the flat bearing surfaces do not make contact and bearing strength is compromised in the fastener installation.

(2) If the countersink in the graphite epoxy material is too deep, electrical contact between the frustro conical fastener surface and the countersink is not adequate. However, the bearing surfaces do make contact and electrical contact is compromised in the fastener installation.

In contrast, the improved self-aligning spherical shape of fastener surfaces, shown herein in accordance with embodiments of the present invention and shown in FIGS. 7, 8, and 9, however, allows intimate contact with the non-complementary frustro conical countersunk mating surfaces of composite material and allows the main bearing load to be distributed over the flat interface surfaces within hole alignment and countersink depth tolerances.

What is claimed is:

1. The method of making an electrical connection between an outer wall portion of a composite structure and conductive fibers within said composite structure extending in a plane parallel to said outer wall portion, said method comprising the steps of:

countersinking a hole in said composite structure in a manner providing a frustro conically shaped inner wall surface, said counter sunk hole having a central axis perpendicular to said plane parallel to said outer wall portion;

inserting an electrically conductive device having a spherically shaped surface portion with a flat bearing surface 256 and a shank 16 with relief in the form of small circumferential grooves into said hole; and then, forcing said spherically shaped surface portion against said frustro conically shaped inner wall surface thereby providing said electrical connection between said outer wall portion of said composite structure and said conductive fibers within said composite structure, the small grooves in the flat bearing surface 256 and shank 16 providing relief for flow of material which may occur and the flat bearing surface distributing the compression load over a relatively wide area rather than the highly stressed point interface of the conical and countersunk surfaces.

2. The method of securing an electrical connection between a sandwich structure comprising a pair of composite structures comprising the steps of:

countersinking a hole having a frustro conical shape in the outer surface of each of said composite structures;

inserting an electrically conductive device having a spherically shaped surface portion into each hole with a flat bearing surface 256 and shank 16 with relief in the form of small circumferential grooves; and then, securing said conductive devices about said sandwich structure by forcing each spherically shaped surface portion into electrical contact with the respective inner surfaces of said frustro conically shaped holes, the small grooves in the flat bearing surface 256 and shank 16 providing relief for flow of material which may occur and the flat bearing surface distributing the compression load over a relatively wide area rather than the highly stressed point of interface of the conical and countersunk surfaces.

* * * * *